(12) United States Patent
Waldner et al.

(10) Patent No.: US 9,561,686 B1
(45) Date of Patent: Feb. 7, 2017

(54) IRRIGATION SYSTEM SUPPORT WHEEL

(71) Applicants: Randy Waldner, Britton, SD (US); Jared Waldner, Britton, SD (US)

(72) Inventors: Randy Waldner, Britton, SD (US); Jared Waldner, Britton, SD (US)

(*) Notice: Subject to any disclaimer, the term of this patent is extended or adjusted under 35 U.S.C. 154(b) by 0 days.

(21) Appl. No.: 14/687,986

(22) Filed: Apr. 16, 2015

(51) Int. Cl.
| | | |
|---|---|---|
| *B05B 3/00* | (2006.01) | |
| *B60B 1/06* | (2006.01) | |
| *A01G 25/09* | (2006.01) | |

(52) U.S. Cl.
CPC ............... *B60B 1/06* (2013.01); *A01G 25/092* (2013.01); *B60B 2900/321* (2013.01)

(58) Field of Classification Search
CPC ........ B60B 1/023; B60B 27/023; B60B 1/003; B60B 1/0253; B60B 2900/111; A01G 25/092; A01G 25/09; A01G 25/16
USPC ......................................... 239/722, 723, 728
See application file for complete search history.

(56) References Cited

U.S. PATENT DOCUMENTS

| | | |
|---|---|---|
| 1,459,190 A | 6/1923 | Walker |
| 1,490,258 A | 4/1924 | Davey |
| 1,803,427 A | 5/1931 | Einfeldt |
| 1,900,910 A | 3/1933 | Carpenter |
| 2,032,293 A | 2/1936 | Maxwell |
| 2,106,135 A | 1/1938 | Henry |
| 2,403,146 A | 7/1946 | Voorhees |
| 2,439,312 A | 4/1948 | McGlaun |
| 3,253,632 A | 5/1966 | Dalrymple |
| 5,226,690 A | 7/1993 | Clark |
| 5,810,452 A * | 9/1998 | Hawthorne ............. B60B 15/02 301/43 |
| 6,615,885 B1 | 9/2003 | Ohm |
| 8,678,054 B2 | 3/2014 | MacPherson |
| 2009/0058176 A1 | 3/2009 | Beirne |
| 2010/0127103 A1* | 5/2010 | Toman ................. A01G 25/092 239/726 |
| 2011/0272254 A1* | 11/2011 | Anderfaas ................. B60B 9/26 198/780 |
| 2013/0192734 A1* | 8/2013 | Seljan ....................... B60C 7/08 152/306 |

* cited by examiner

*Primary Examiner* — Davis Hwu
(74) *Attorney, Agent, or Firm* — Jeffrey A. Proehl; Woods Fuller Shultz & Smith P.C.

(57) ABSTRACT

A support wheel for an irrigation system may comprise a rim configured to contact the ground with a ground contact surface, with the rim having an inner surface and an outer surface forming the ground contact surface. The rim may have a first edge and a second edge, with the first edge lying in a first plane. A hub may be positioned at a center of the wheel and being configured to mount on an axle. A spoke structure may extend from the hub of the wheel to the rim of the wheel. The spoke structure may include a plurality of frames, and at least one of the frames may be mounted on the inner surface of the rim along a line extending from the first edge to the second edge of the rim in a non-parallel and non-perpendicular orientation to the first plane.

5 Claims, 4 Drawing Sheets

IRRIGATION SYSTEM SUPPORT WHEEL

BACKGROUND

Field

The present disclosure relates to irrigation systems and more particularly pertains to a new irrigation system support wheel for providing improved durability and performance in use.

SUMMARY

In one aspect, the present disclosure relates to a support wheel for an irrigation system. The wheel may comprise a rim configured to contact the ground with a ground contact surface, with the rim having an inner surface and an outer surface forming the ground contact surface. The rim may have a first edge and a second edge, the first edge lying in a first plane. The wheel may comprise a hub positioned at a center of the wheel and being configured to mount on an axle, and a spoke structure extending from the hub of the wheel to the rim of the wheel. The spoke structure may include a plurality of frames, with at least one of the frames being mounted on the inner surface of the rim along a line extending from the first edge to the second edge of the rim in a non-parallel and non-perpendicular orientation to the first plane.

In another aspect, the disclosure relates to an irrigation system that may comprise a center pivot, a pipe radiating outwardly from the center pivot, at least one support tower supporting the pipe about the ground surface, at least one wheel rotatably mounted on the support tower, and a drive apparatus configured to rotate the at least one wheel. The wheel may comprise a rim configured to contact the ground with a ground contact surface, with the rim having an inner surface and an outer surface forming the ground contact surface. The rim may have a first edge and a second edge, the first edge lying in a first plane. The wheel may comprise a hub positioned at a center of the wheel and being configured to mount on an axle, and a spoke structure extending from the hub of the wheel to the rim of the wheel. The spoke structure may include a plurality of frames, with at least one of the frames being mounted on the inner surface of the rim along a line extending from the first edge to the second edge of the rim in a non-parallel and non-perpendicular orientation to the first plane.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
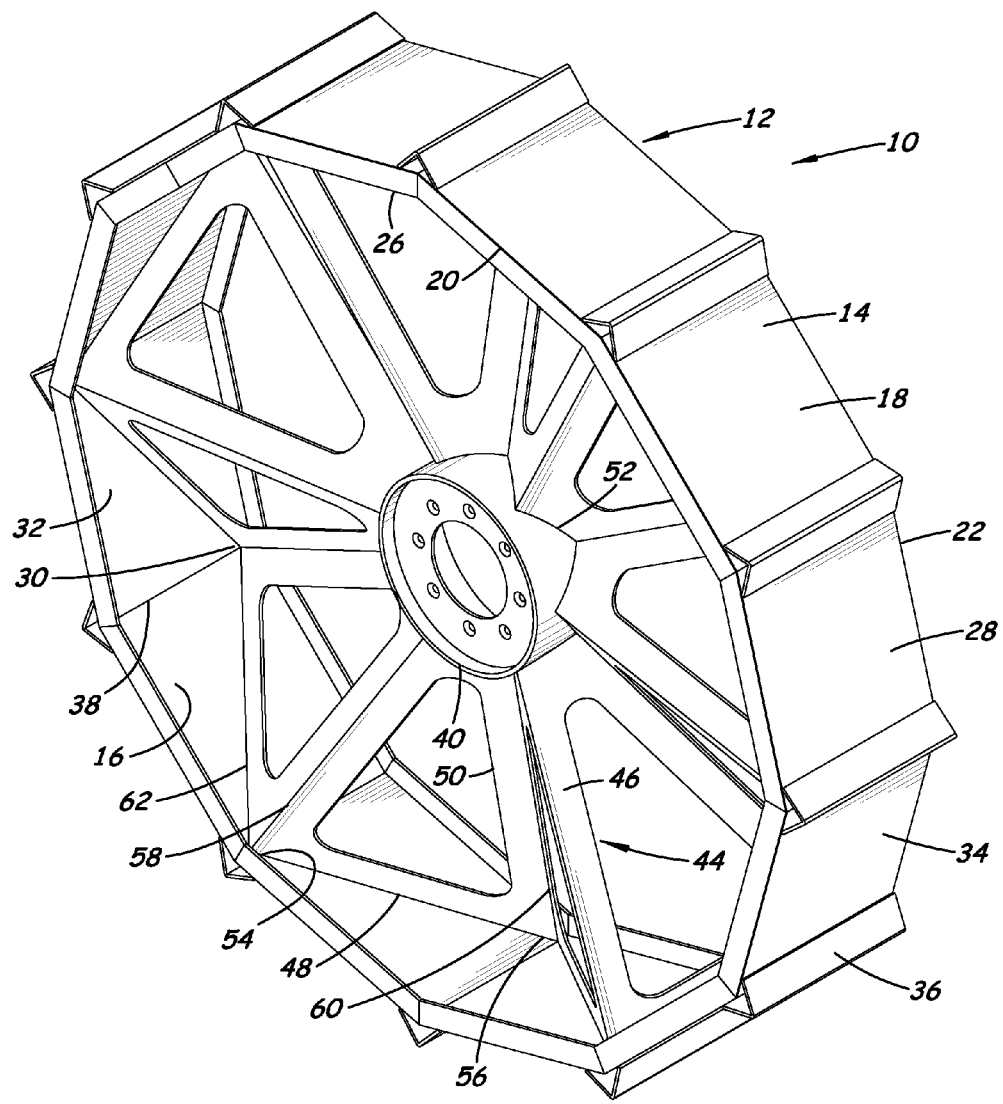
FIG. 1 is a schematic perspective view of a new irrigation system support wheel for an irrigation system according to the present disclosure.
Figure 2:
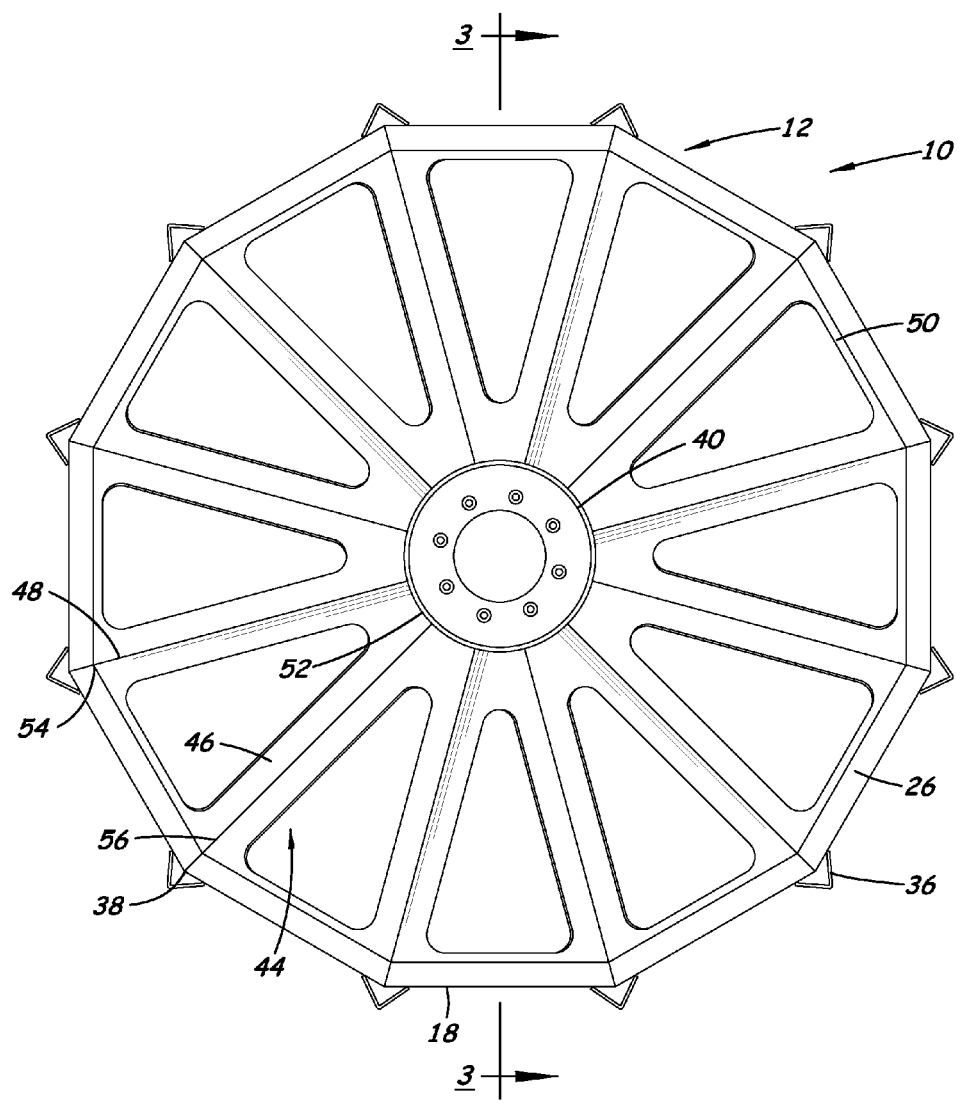
FIG. 2 is a schematic side view of the wheel, according to an illustrative embodiment.
Figure 3:
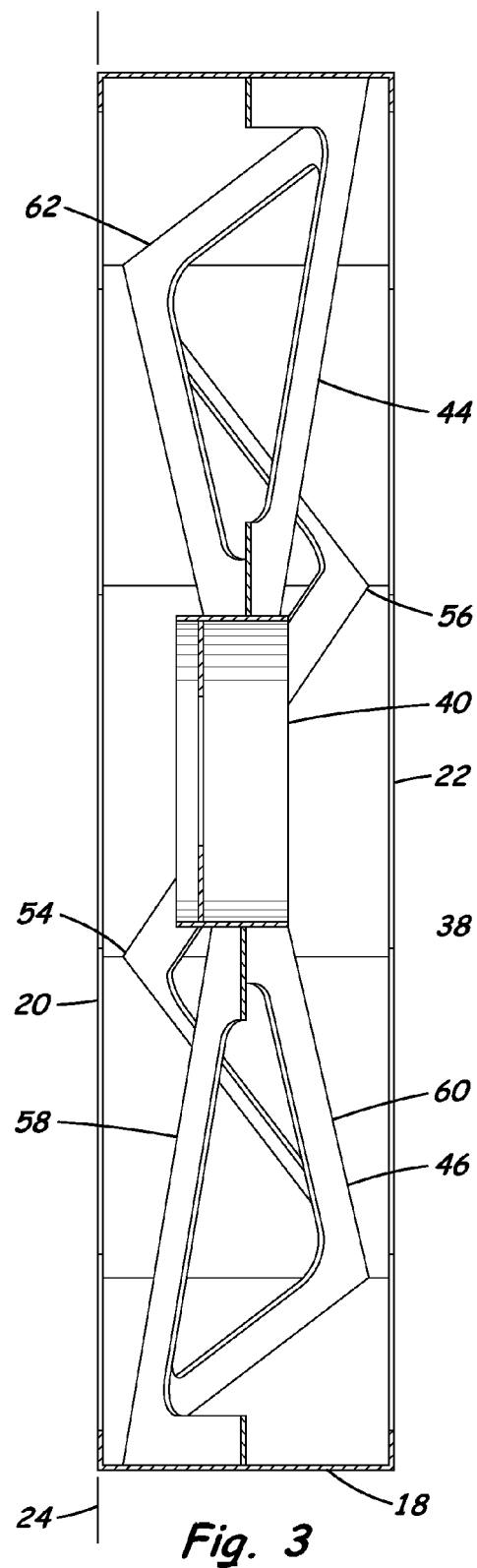
FIG. 3 is a schematic sectional view of the wheel taken along line 3-3 of FIG. 2.
Figure 4:
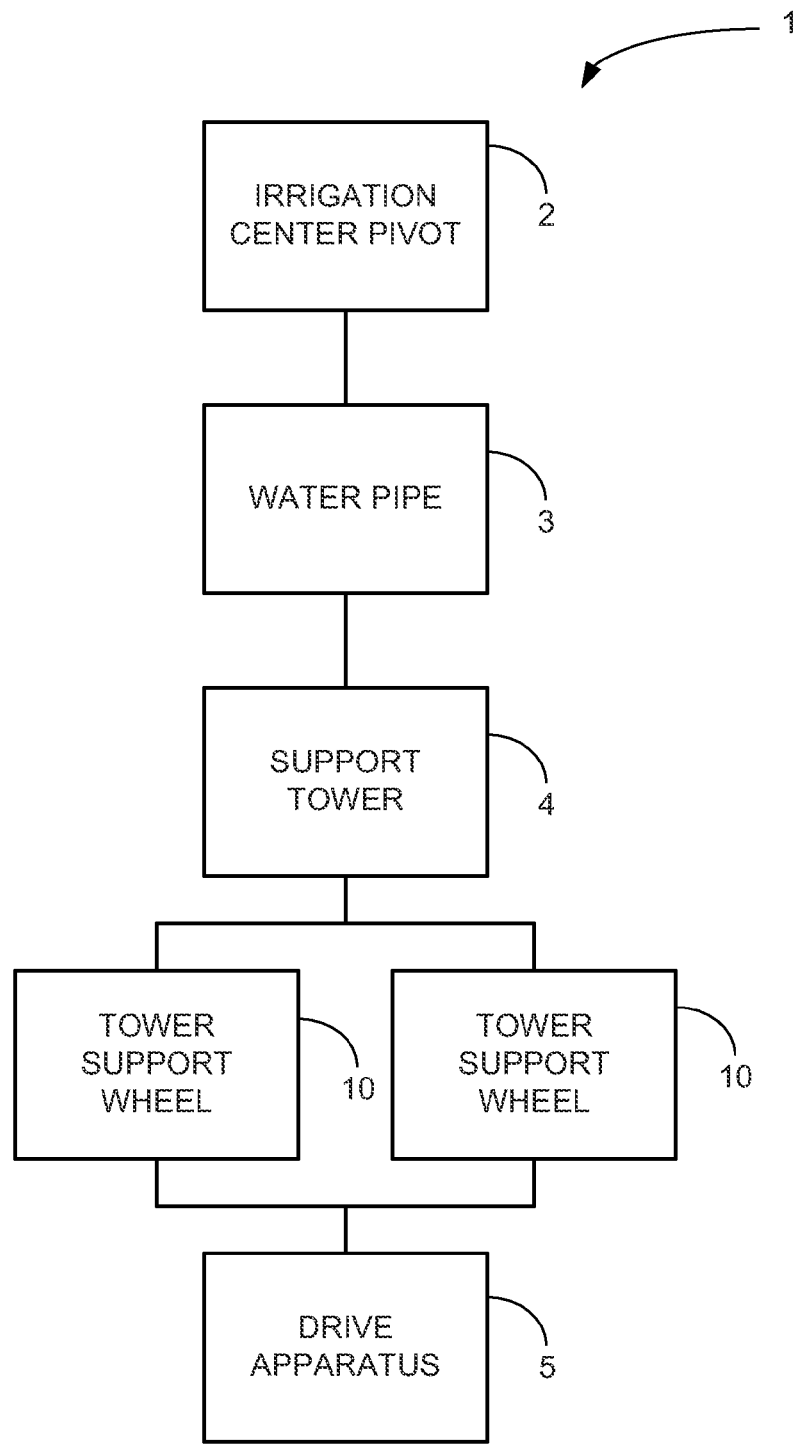
FIG. 4 is a schematic diagram of a system including the wheel, according to an illustrative embodiment.

With reference now to the drawings, and in particular to FIGS. 1 through 4 thereof, a new irrigation system support wheel embodying the principles and concepts of the disclosed subject matter will be described.

In one aspect, the disclosure is directed to a wheel 10 suitable for support of a portion of an irrigation system, and in other aspects, the disclosure is directed to an irrigation system 1 that may include a center pivot 2, a pipe 3 radiating outwardly from the center pivot, at least one support tower 4 for supporting the pipe above the ground surface, at least one wheel 10 rotatably mounted on the support tower, and a drive apparatus 5 which may be configured to rotate the at least one wheel to advance the support tower 4 and the pipe 3 about the center pivot 2. Typically, the wheel 10 may be implemented in pairs on each of the support towers of the system 1, and may be driven by the drive apparatus to move the pipe of the irrigation system over the ground surface of an agricultural crop field.

In general, the wheel 10 may include a rim 12 configured to contact the ground, a hub 40 positioned at the center of the wheel 10, and a spoke structure 44 extending from the hub 40 of the wheel to the rim 12 to connect the hub and the rim. In greater detail, the rim 12 may include a ground contact surface 14 for contacting the ground surface across which the irrigation system 1 travels. The rim 12 may be generally cylindrical in configuration, and may have an inner surface 16 and an outer surface 18 located opposite of the inner surface. The rim 12 may also have a first edge 20 and a second edge 22 positioned on opposite sides of the inner 16 and outer 18 surfaces. The first edge 20 may lie in a first plane 24 which may be oriented substantially vertically when the wheel 10 is mounted for use on an irrigation system, and the second edge may also lie in a second plane which is also substantially vertically oriented when the wheel is mounted for use. One or both of the edges 20, 22 may include a lip 26 which extends radially inward from the inner surface 16 of the rim to enhance the bending resistance of the wheel.

In some embodiments, the rim 12 may be comprised of a plurality of rim portions 28, and each of the rim portions may be substantially rectangular in shape with a plurality of corners 30. A rim portion 28 may have an inner surface portion 32 of the inner surface 16 and an outer surface portion 34 of the outer surface 18. Each of the inner surface portions 32 may be substantially planar, and each of the outer surface portions 34 may also be substantially planar in shape. A plurality of cleats 36 may be positioned on the outer surface 18 of the rim, and at least one cleat 36 may extend substantially from the first edge 20 to the second edge 22 of the rim. At least one of the cleats 36 may have a substantially triangular side profile with an apex of the triangle extending outwardly from the outer surface. At least one of the cleats 36 may be mounted on the outer surface at a juncture 38 of two of the rim portions 28 with the cleat bridging over the juncture between the portions 28.

The hub 40 may be positioned at the center of the wheel 10 and may be configured to mount on an axle which in turn may be connected to the drive apparatus 5 to cause rotation of the axle and wheel.

The spoke structure 44 may connect the hub 40 to the rim and may extend from the hub to the inner surface of the rim, and more particularly the inner surface portions 32 of the rim portions 28. In some embodiments, the spoke structure 44 may include a plurality of frames 46. At least one frame 46 may be mounted on each of the rim portions 28. In some embodiments, each of the rim portions has a corresponding frame 46. At least one of the frames may be substantially triangular in shape, with a substantially triangular perimeter 48 and in some embodiments an opening 50 defined by the frame which is also substantially triangular in shape. At least one of the frames 46 may be mounted on the inner surface 16 of the rim along a line that extends from the first edge 20 to the second edge 22. At least one of the frames 46 may have an inner apex 52 located at the hub 40 and a pair of outer apexes 54, 56 located at the rim 12. A first one 54 of the outer apexes may be located at the first edge 20 of the rim, and a second one 56 of the apexes may be located at the second edge 22 of the rim. In some embodiments, the first apex 54 of a said frame may be located at one of the corners of the corresponding rim portion, and the second apex 56 may be located at an opposite one of the corners of the rim portion. The frames 46 may each have a pair of side edges 58, 60 extending from the inner apex 52 to each of the outer apexes 54 and 56. A side edge of one of the frames may be positioned adjacent to a side edge of an adjacent frame in the spoke structure. The frames may be mounted to the inner surface 16 of the rim along a mounting line 62, and the mounting line may have a substantially zig-zag or serpentine pattern formed along the inner surface 16 between the side edges of the rim. The meandering or oscillating nature of the mounting line may facilitate the movement of debris, soil, mud and the like out of the interior of the wheel when such matter enters the interior of the wheel as the wheel moves across the ground surface of the field.

At least one of the frames 46 may have a planar character, and the frame may define a plane that is angled with respect to the first plane 24, and the mounting line may thus also be angled with respect to the first plane. The angle defined between the first plane and the plane of the frame may be non-parallel (e.g., 0 degrees) and non-perpendicular (e.g., 90 degrees). In some embodiments, the angle may range from approximately 25 degrees and approximately 65 degrees, and in some highly preferred embodiments the angle may range from approximately 30 degrees to approximately 60 degrees. In some embodiments, for an adjacent pair of the frames 46, a first one of the frames 46 may extend in a first deviation plane that is angled with respect to the first plane 24 and a second one of the frames may extend in a second deviation plane that is also angled with respect to the first plane 20, but is not coplanar with the first deviation plane. The first and second deviation planes may thus be angled with respect to each other.

In some embodiments, the rim 12 is formed of a substantially rigid material such that the ground contact surface 14 of the rim is also substantially rigid. In some embodiments, the wheel 10 is substantially completely formed out of rigid materials to have a rigid construction that is not pliable.

In some implementations, a subunit including a rim portion 28 and the corresponding frame 46 may be formed, and a plurality of the subunits may be assembled into a wheel unit by welding or otherwise connecting the edges of the rim portions together at the junctures 38 as well as welding or otherwise connecting the inner apexes 52 of the frames to the hub.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A support wheel for an irrigation system comprising:
a rim configured to contact the ground with a ground contact surface, the rim having an inner surface and an outer surface forming the ground contact surface, the rim having a first edge and a second edge, the first edge lying in a first plane;
a hub positioned at a center of the wheel and being configured to mount on an axle;
a spoke structure extending from the hub of the wheel to the rim of the wheel, the spoke structure including a plurality of frames, at least one of the frames being mounted on the inner surface of the rim along a line extending from the first edge to the second edge of the rim in a non-parallel and non-perpendicular orientation to the first plane;
wherein at least one of the frames is substantially triangular in shape with a substantially triangular perimeter.

2. The wheel of claim 1 wherein at least one frame has an inner apex at the hub and a pair of outer apexes at the rim.

3. The wheel of claim 2 wherein a first one of the outer apexes is located at the first edge of the rim and a second one of the outer apexes is located at the second edge.

4. The wheel of claim 2 wherein the rim comprises a plurality of rim portions and wherein at least one of the rim portions has a plurality of corners, the first apex of a said frame being located at one of the corners of the at least one rim portion and the second apex of said frame being located at an opposite one of the corners of the at least one rim portion.

5. The wheel of claim 3 wherein the frames of the spoke structure have a pair of side edges extending from the inner apex to each of the outer apexes, and a said side edge of one frame being positioned adjacent to a said side edge of an adjacent frame.

* * * * *